United States Patent
Rahman et al.

(10) Patent No.: US 7,346,317 B2
(45) Date of Patent: Mar. 18, 2008

(54) DYNAMIC GAIN AND PHASE COMPENSATION FOR POWER AMPLIFIER LOAD SWITCHING

(75) Inventors: Mahibur Rahman, Lake Worth, FL (US); Pravinkumar Premakanthan, Delray Beach, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 501 days.

(21) Appl. No.: 11/099,179

(22) Filed: Apr. 4, 2005

(65) Prior Publication Data

US 2006/0223462 A1 Oct. 5, 2006

(51) Int. Cl.
*H04B 1/04* (2006.01)
(52) U.S. Cl. .................. 455/126; 455/129; 330/284
(58) Field of Classification Search ............. None
See application file for complete search history.

(56) References Cited

U.S. PATENT DOCUMENTS

| | | | |
|---|---|---|---|
| 6,160,449 A * | 12/2000 | Klomsdorf et al. ......... 330/279 |
| 6,438,360 B1 | 8/2002 | Alberth, Jr. et al. |
| 6,556,814 B1 | 4/2003 | Klomsdorf et al. |
| 2007/0184793 A1 * | 8/2007 | Drogi et al. ............. 455/127.1 |

* cited by examiner

*Primary Examiner*—Thanh Cong Le
(74) *Attorney, Agent, or Firm*—Ingrassia Fisher & Lorenz P C

(57) ABSTRACT

Methods and apparatus are provided for gain and phase compensation in a radio frequency (RF) transmitter (108). The RF transmitter (108) has at least one power amplifier (PA) (205) for providing a transmitted signal having a signal power therefrom. An RF power detector (208) is coupled to the at least one PA (205) for detecting the signal power of the transmitted signal and an analog to digital (A/D) converter (210) is coupled to the RF power detector (208). A hysteresis unit (214) is coupled to the A/D converter (210) for generating a pulse (222) in response to a power threshold being crossed and a load switch control unit (218, 232) is coupled to the hysteresis unit and the at least one power amplifier for providing gain and phase compensation in response to the pulse.

20 Claims, 8 Drawing Sheets

246

800

DYNAMIC GAIN AND PHASE COMPENSATION FOR POWER AMPLIFIER LOAD SWITCHING

FIELD OF THE INVENTION

The present invention generally relates to radio frequency (RF) transmitters and more particularly relates to load switching control for RF transmitter power amplifiers.

BACKGROUND OF THE INVENTION

Transmit Power Amplifier (PA) load switching is a technique in a transmitter of a communications device which dynamically adjusts the impedance match at the output of the transmitter PA to improve the linearity, efficiency, and current drain of the PA at different power levels. This is accomplished by dynamically switching among multiple loads at the PA output. Unfortunately, this PA load switching technique causes large abrupt power and phase changes at the PA output. This leads to unacceptable transient Adjacent Channel Power and phase discontinuity performance in the transmitted signal making it difficult to meet the necessary transmit performance requirements for various communication standards (e.g., GSM, EDGE, WCDMA). Also, large abrupt power changes due to the load switching causes the closed loop power control system longer to track out such large power steps during a power ramping process. This in turn makes it difficult to also meet the required Power versus Time mask specifications for a given communications standard in such situations.

Accordingly, it is desirable to quickly and effectively compensate for large abrupt power and phase discontinuities due to PA load switching to meet the necessary transmit performance requirements. In addition, it is desirable to automatically and effectively control this load switching when a closed loop transmit power control system is employed to achieve the required transmit power accuracies at different power levels. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
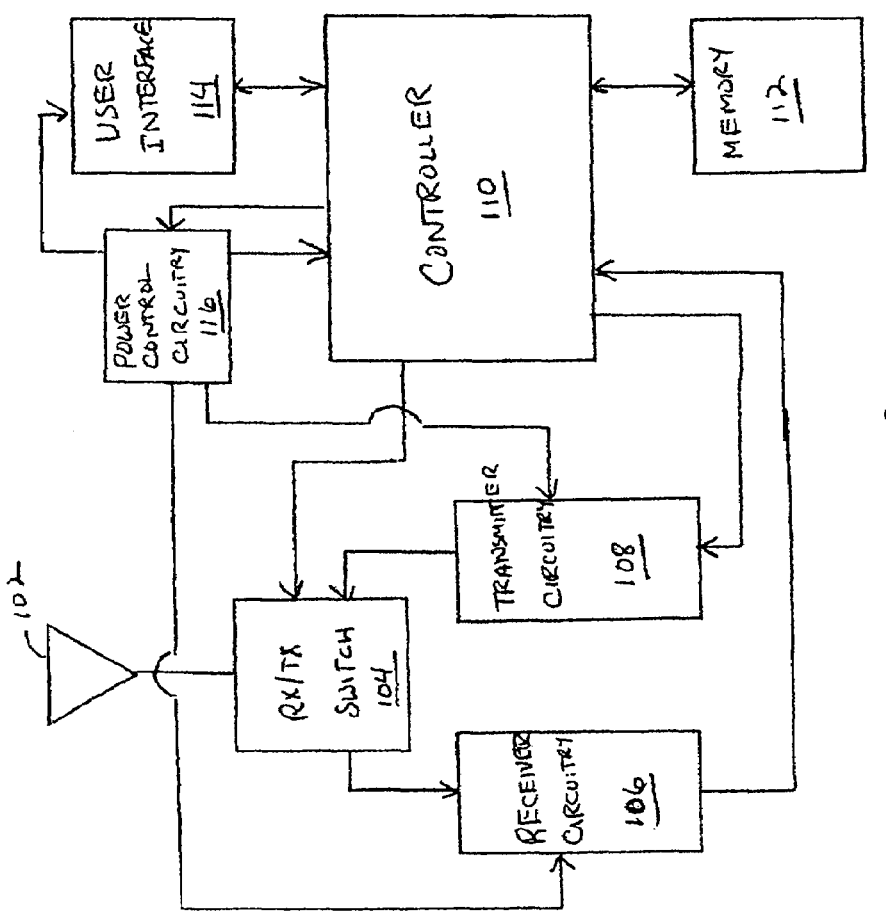
FIG. 1 is a block diagram of an electronic communication device in accordance with a preferred embodiment of the present invention.

Referring to FIG. 1, a block diagram of an electronic communication device 100, such as a cellular telephone, is shown. Although the electronic communication device 100 is depicted as a cellular telephone, the electronic communication device can be implemented as a pager, a laptop computer with a wireless connection, a personal digital assistant with wireless connection, or the like. The electronic communication device 100 includes an antenna 102 for receiving and transmitting radio frequency (RF) signals. A receive/transmit switch 104 selectively couples the antenna 102 to receiver circuitry 106 and transmitter circuitry 108 in a manner familiar to those skilled in the art. The receiver circuitry 106 demodulates and decodes the RF signals to derive information and is coupled to a controller 110 for providing the decoded information thereto for utilization thereby in accordance with the function(s) of the electronic communication device 100.

The controller 110 also provides information to the transmitter circuitry 108 for encoding and modulating information into RF signals for transmission from the antenna 102. As is well-known in the art, the controller 110 is typically coupled to a memory device 112 and a user interface 114 to perform the functions of the electronic communication device 100. Power control circuitry 116 is coupled to the components of the electronic communication device 100, such as the controller 110, the receiver circuitry 106, the transmitter circuitry 108 and/or the user interface 114, to provide appropriate operational voltage and current to those components. The user interface 114 may include one or more user interface devices such as a microphone, a speaker, key inputs, such as a keypad and a display for displaying information to a user and which may also accept touch screen inputs.

Figure 2:
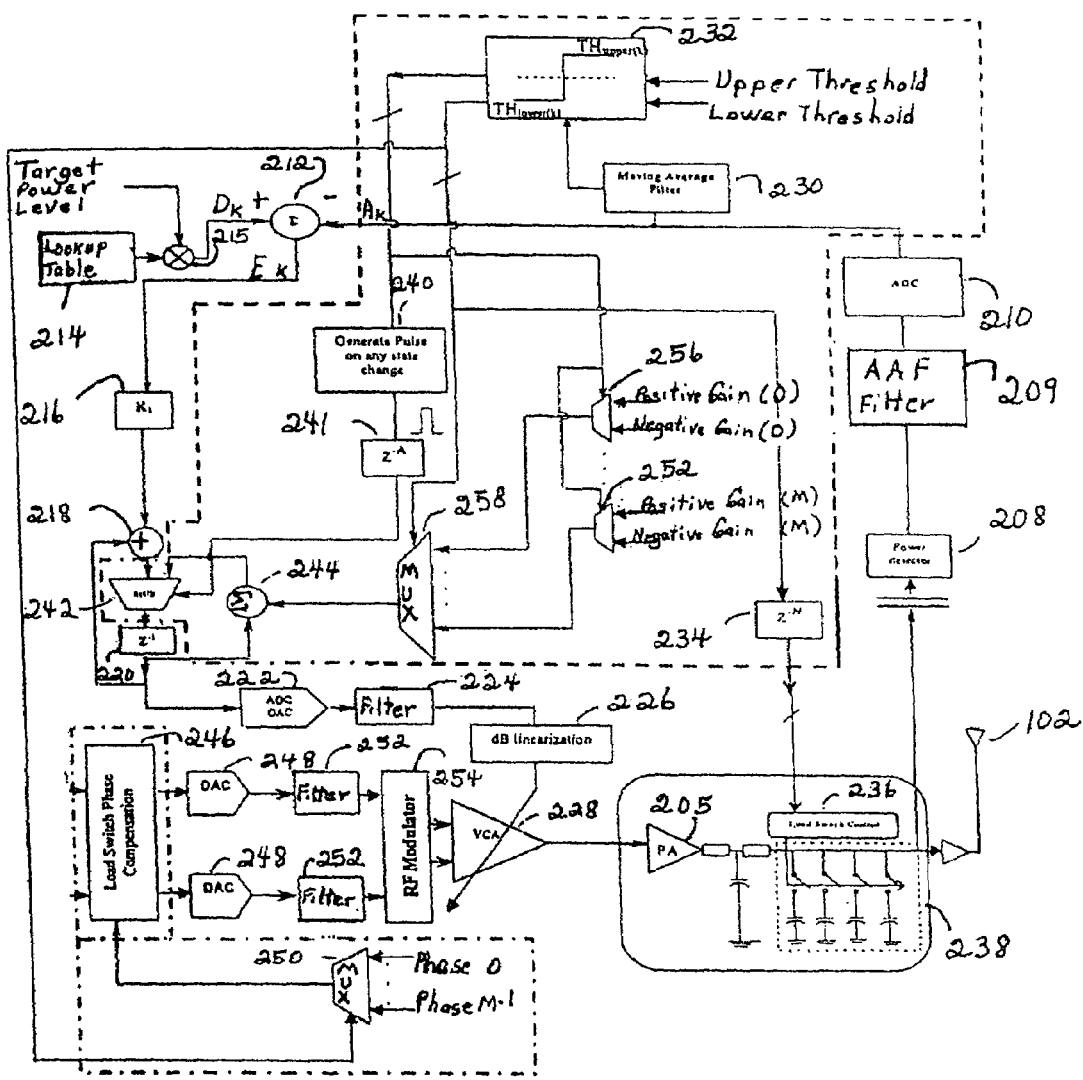
FIG. 2 is a block diagram of a radio frequency transmitter of the electronic communication device of FIG. 1 in accordance with a preferred embodiment of the present invention.

FIG. 2 shows a block diagram of closed loop transmit power control system 108 with dynamic gain and phase compensation for a single Power Amplifier (PA) 205 with load switch control. Power Amplifiers 205 have been proposed to have an impedance network (load switch) that adjusts the output impedance of the PA 205 in accordance to operating power levels. This helps in maintaining linearity at high power levels while improving PA 205 efficiency at low power levels. However, this results in large abrupt change in gain and phase discontinuities at the PA 205 output. Measured results indicate abrupt power change of up to seven dB and phase discontinuity of sixty degrees as a result of PA 205 load switching. It is necessary to avoid these abrupt gain and phase jumps to meet transient adjacent channel power, EVM (Error Vector Magnitude), and phase continuity specifications for a given communications standard (e.g., WCDMA, GSM, EDGE). It is also necessary to avoid the power steps to maintain loop stability of the closed loop power control system. In accordance with the present invention, a method and apparatus to dynamically perform digital gain and phase compensations using a closed loop power control system to avoid these transmit system performance and power control system loop stability issues is disclosed. While the preferred embodiment of the present invention depicts a particular gain and phase compensation scheme, it can easily be understood by those skilled in the art that the automatic gain and phase compensation can be performed at any point in the transmit feedforward path and, more particularly, the application of the gain compensation could be performed at any point in the power control signal path.

FIG. 2 illustrates a closed loop power control system for transmitter circuitry 108 where gain and phase compensation are performed for a plurality of distinct load switch states represented in FIG. 2 as one up to M load switch states. After the RF power detector 208 in the detect path of the power control system following an anti-aliasing filter 209 and an A/D converter 210, the output of the A/D converter ($A_k$) is compared to a reference ramp up/down power versus time profile ($D_k$) at the subtractor 212. The indicated reference ramp profile is created by multiplying the output of a pre-programmed lookup table 214 with a desired target output power level using the multiplier 215. The error value ($E_k$) created by comparing the detect and reference paths is then averaged in a first order digital loop filter comprised of an open loop gain stage 216 and an integrator (comprised of accumulator 218 and delay stage 220 with output of delay stage 220 fed back to accumulator 218). The output of this loop filter is then converted to analog form using the digital-to-analog (D/A) converter 222. The output of the D/A converter 222 is then passed through an analog D/A reconstruction filter 224 before being fed into a dB linearizer (i.e., conversion to a logarithmic format) block 226 to linearize the power control loop. The dB linearizer 226 output is fed to the RF VCA stage 228. The advantage of applying the gain compensation to the RF VCA 228 rather than at the baseband is that baseband gain changes leads to carrier leakage issues and the baseband signal path may not have the necessary dynamic range required. Also, baseband gain changes can lead to transients at the PA 205 output since the gain compensation at baseband would be shaped by the step response of the baseband filters.

Referring to the operation of a method for load switch gain compensation in accordance with the preferred embodiment of the present invention, a moving average digital filter 230 with a fixed bandwidth located at the output the A/D converter 210 located in the detect signal path is used to detect the average power level of the transmitted signal during a power transition operation. The output of the filter 230 is used by a hyteresis unit 232 to detect if either a predetermined upper or a predetermined lower threshold level is crossed. When such a threshold crossing occurs, the load switch gain and phase compensations are applied prior to when a load switch state change is actually applied. This particular time alignment of events is achieved by the fixed delay ($z^{-N}$) 234 in the load switch control signal path. Hence, this delay ensures that the gain and phase compensations are time aligned at the PA 205 output to minimize any gain and phase transients that can otherwise occur at the PA 205 output. Following these gain and phase compensations and the specified delay 234, the load switch state is altered by the load switch control 236 to improve linearity and efficiency of the power amplifier 205 at the various transmit power regions as determined by the PA load switches 238.

The load switch gain compensation operation is initiated as soon as there is an upper or lower threshold crossing. When ever there is a state change at the output of the hysteresis block 232, a pulse is generated by block 240. This pulse is delayed by another fixed amount ($z^{-4}$) by delay block 241 to time align the gain and phase compensations at the VCA 226 output. The output of this delay block 232 is fed into to the loop integrator of the closed loop power control system at multiplexer 242 to dynamically perform the load switch gain compensation effectively. When the gain compensation pulse at the output of the delay block 241 is supplied to the loop integrator through multiplexer 242, either a positive or a negative gain compensation value (in units of decibels) is added to the current state of the loop integrator using the adder 244. The result of this addition is passed through the multiplexor 242 and loaded into the loop integrator register 220 to update its state to gain compensate for the load switch state change. The polarity of the gain compensation is dictated by the current state of hyteresis block 232 output due to either an upper or lower threshold crossing. This method of dynamic gain compensation does not cause any undesirable transients at the output of the loop integrator since it is an instantaneous correction of its current state.

Around the same time that the gain compensation is performed, the load switch phase compensation 246 is performed within the quadrature feedforward signal path at the inputs of the I and Q D/A converters (DACs) 248. The output state of the hysteresis block 232 selects among several pre-programmed phase values at the multiplexor 250 to apply a particular phase compensation value based upon the new state of the load switch control block 236. Within the transmit feedforward signal path, the output of the DACs 248 is filtered through analog reconstruction filters 252, combined in a conventional RF modulator unit 254 before the signals are amplified through VCA 228 and PA 205 for transmission from the antenna 102. While the preferred embodiment of the present invention discloses improved gain and phase compensation methods for load switching at the PA 205, those skilled in the art will recognize that the present invention may also be utilized for phase and gain compensation at any Radio Frequency/Intermediate Frequency (RF/IF) analog stage in the transmit feedforward signal path, such as the analog reconstruction filters 252, the RF modulator unit 254, the VCA 228, the receive/transmit switch 104 or a buck switch in the PA module 205.

FIG. 2 shows a generalized load switch system 256 which supports up to M load switch states. This generalized system requires a hysteresis unit 232 which supports M upper and lower threshold levels to support M load switch states. Whenever a particular threshold crossing event occurs, a the $\log_2 M$ bits wide signal at the output of the hysteresis unit reflects a new state. When ever the output of the hysteresis unit changes, a pulse is derived from this event to dynamically update the current loop integrator state through adder 244 and multiplexor 242 using one of M positive/negative gain compensation values as determined by MUX 258 based upon which threshold crossing occurred within the hysteresis unit 232. In the phase compensation path, one of M phase compensation values as determined by MUX 250 is selected using the $\log_2 M$ bits wide control signal from the hysteresis unit to perform the necessary phase compensation within the I-Q feedforward baseband digital signal path.

Figure 3:
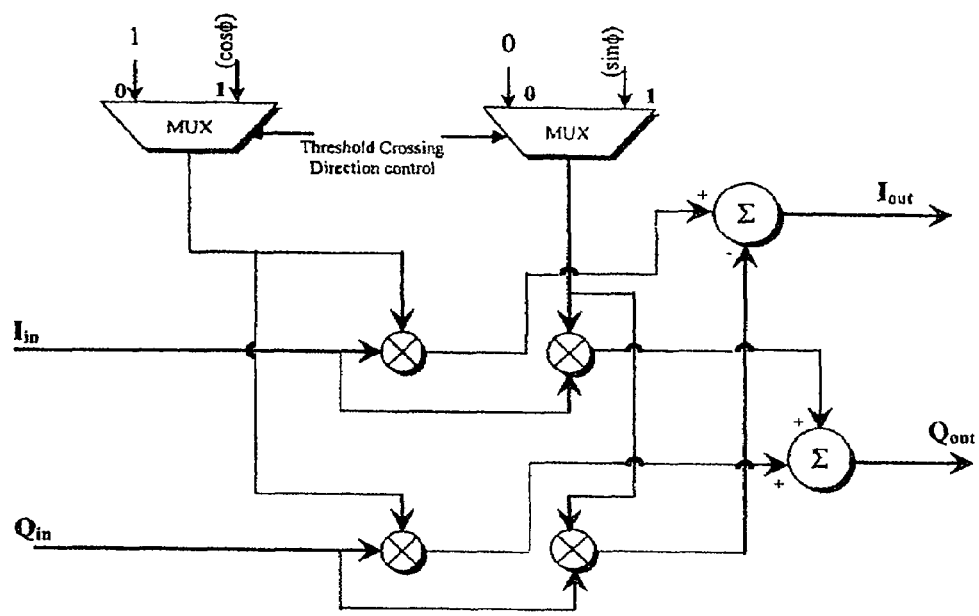
FIG. 3 is a block diagram of a phase compensation circuit of the radio frequency transmitter of FIG. 2 in accordance with the preferred embodiment of the present invention.

A more detailed diagram of the phase compensation block 246 is shown in FIG. 3. In accordance with the preferred embodiment of the present invention, the output of MUX 250 is utilized to control the operation of multiplexers 302 and 304 to perform the digital phase compensation at the input to the digital pulse shaping filters in accordance with a digital complex phase shift operation. The phase compensation is performed by applying a calibrated phase shift to the input signal using a complex multiply of the input signal by $e^{-j*phi}$ where phi is a known phase shift quantity. Given that I_in and Q_in are the quadrature input signals, the phase shifted outputs can be computed as:

$$I\_out=I\_in*cos(phi)+Q\_in*sin(phi)$$

$$Q\_out=Q\_in*cos(phi)-I\_in*sin(phi)$$

where cos(phi) and sin(phi) are pre-programmed phase compensation values reflecting the cosine and sine of the desired phase shift amount. Also, I_out and Q_out are outputs of this phase compensation unit.

Figure 4:
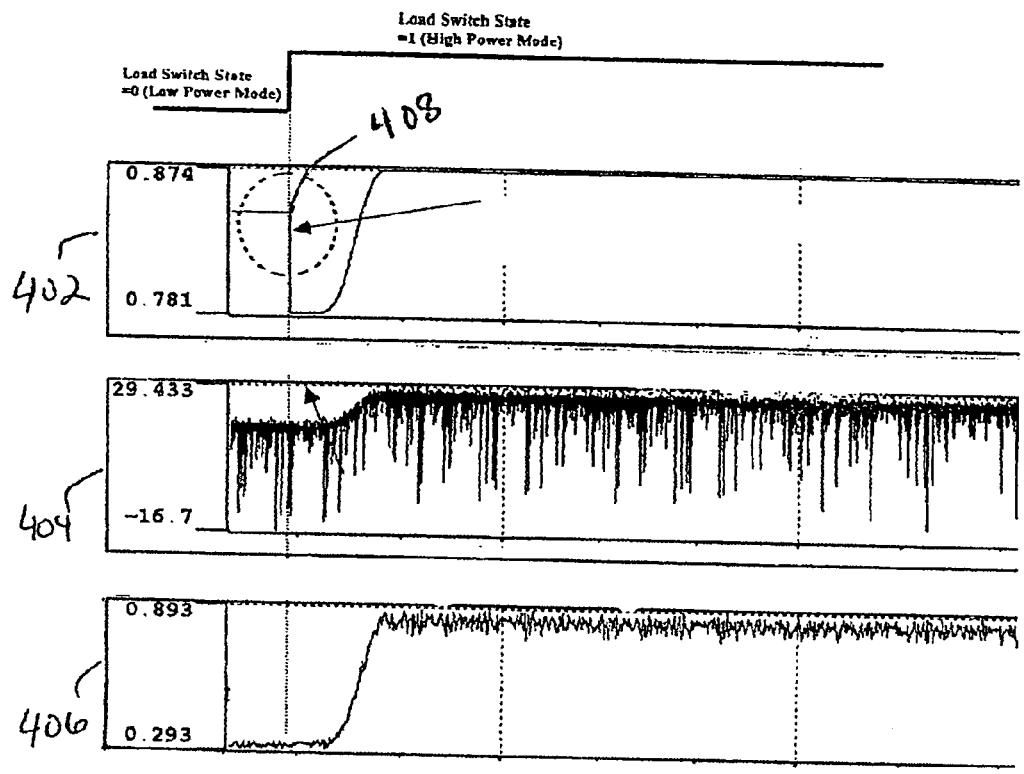
FIG. 4 is simulation results in three signal plots of a negative gain compensation during ramp up condition of the radio frequency transmitter of FIG. 2 in accordance with the preferred embodiment of the present invention.

Referring to FIG. 4, a simulation 400 of results of the gain compensation method of the present invention for a ramp up sequence is shown. Plot 402 shows the signal at the output of the loop integrator (i.e., the output of loop integrator register 220). The antenna 102 power output is shown in plot 404 while the detected power at the ADC 210 output is shown in plot 406. Assume a condition when, during a multi slot power change, the load switch is about to change state from 0 to 1 from slot N to slot N+1. In this case, a positive gain change of around +seven dB would occur at the PA module 238 at time 408. This sudden jump in the transmitter 108 gain has to be compensated to avoid degradation in the transmit ACLR (Adjacent Channel Leakage Ratio) performance. To provide the corresponding gain replacement, a corrected value is latched at the loop integrator output by suitably delaying the single clock cycle-pulse 240 using the delay block 241 in such a way that at the PA module 238 output, both jumps occur at the same time. This also allows the feedback path of the power control loop to not see any power discontinuities. FIG. 4, therefore, shows the loop integrator output 402, the gain compensated antenna 102 power 404, the detected power at the A/D 210 (FIG. 2) output 406, during a power transition 408 from a lower power to a higher power.

Figure 5:
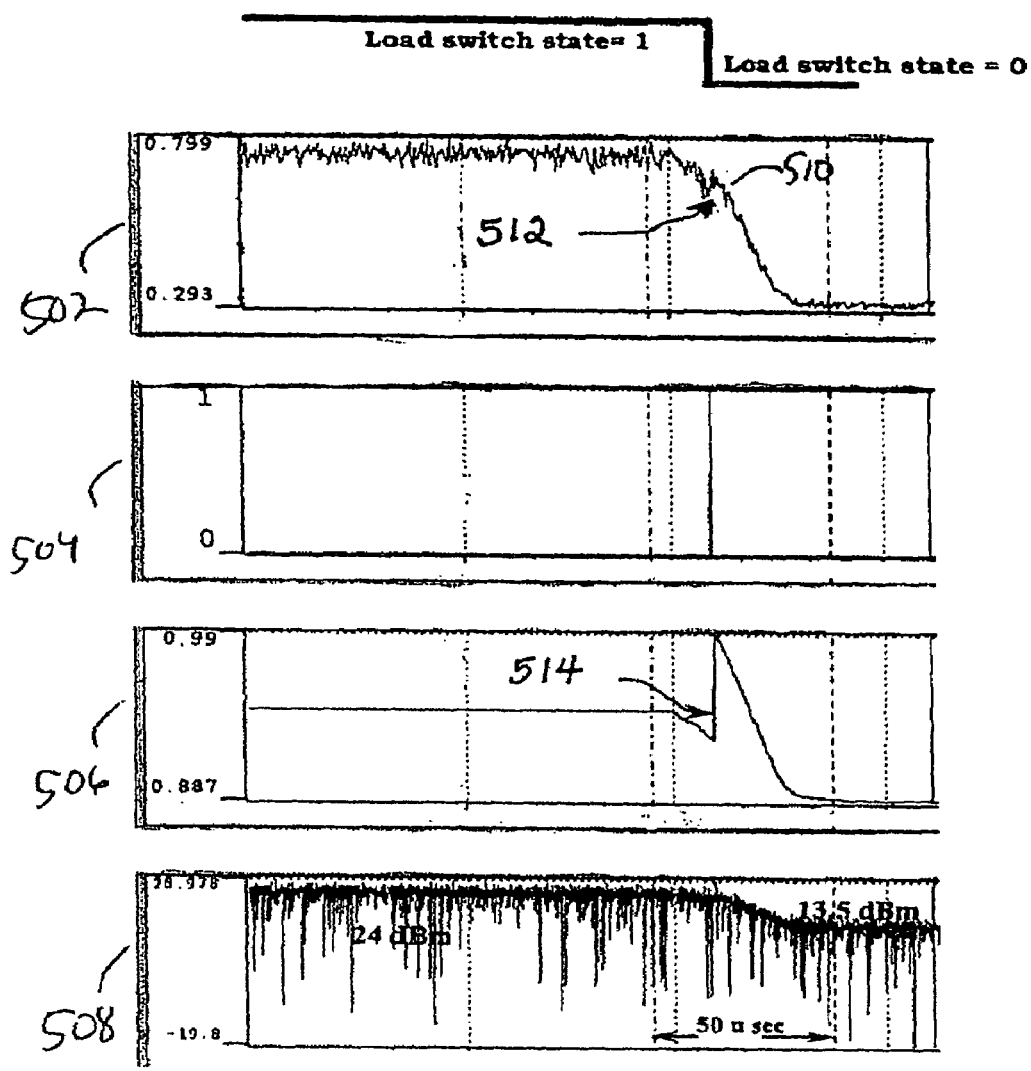
FIG. 5 is simulation results in four signal plots of a positive gain replacement during a ramp down condition of the radio frequency transmitter of FIG. 2 in accordance with the preferred embodiment of the present invention.

Referring to FIG. 5, simulation plots 500 describe a positive gain replacement being performed during a ramp down condition. Plot 502 plots the output of the A/D 210, Plot 504 plots the the pulse generated by the pulse generator unit 240, Plot 506 plots the loop integrator output with the positive gain replacement is performed. And plot 508 plots the antenna 102 power. At time 510 a lower threshold, corresponding to 14.5 dBm at the antenna 102, is crossed 512 and the positive gain replacement 514 is shown in plot 506. The result of this positive gain replacement causes no visible power discontinuities in plot 508.

Figure 6:
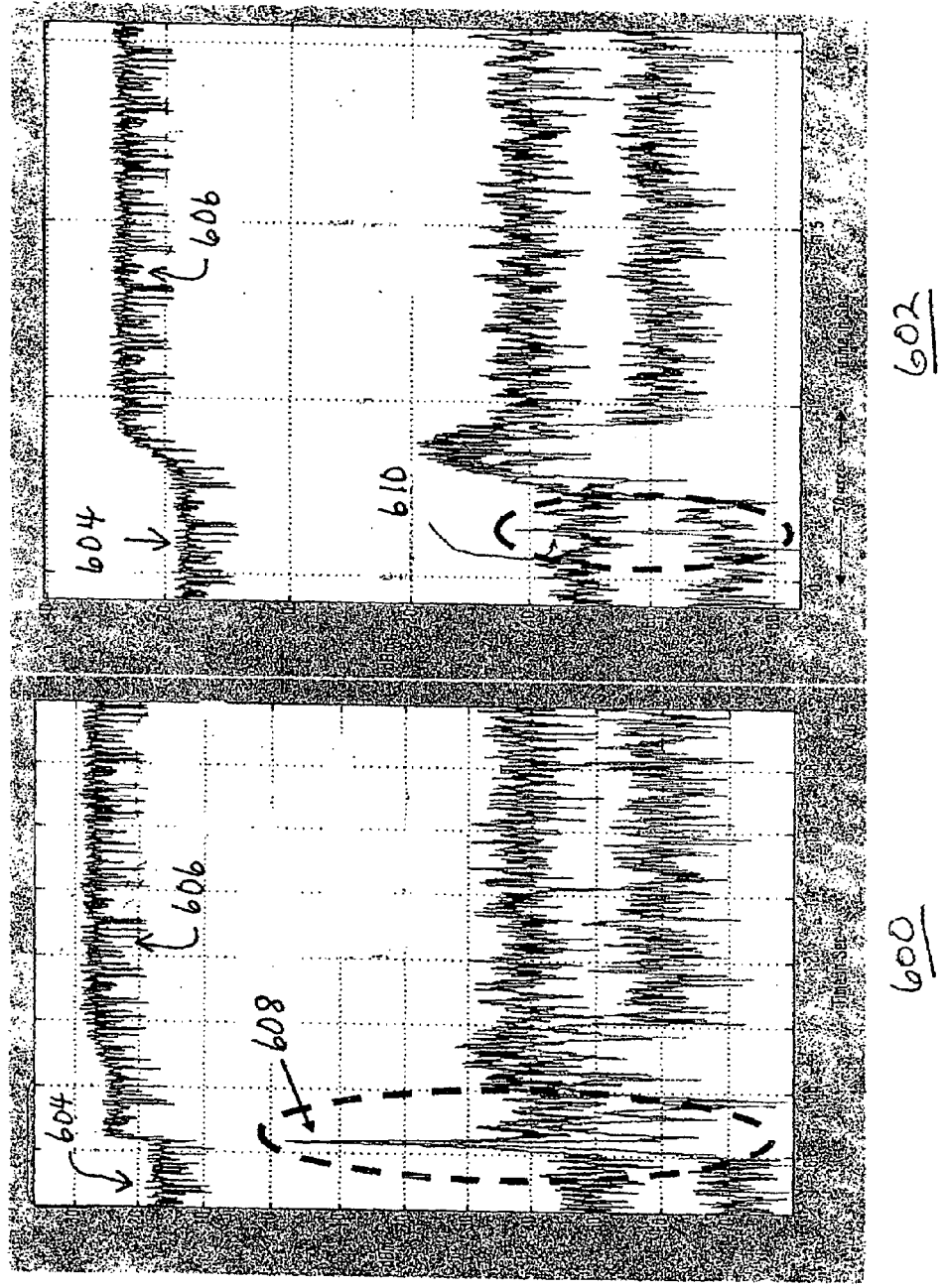
FIG. 6 are two simulation results of signals in a transmit power vs. time plot without and with the gain compensation of the radio frequency transmitter of FIG. 2 in accordance with the preferred embodiment of the present invention.
Figure 7:
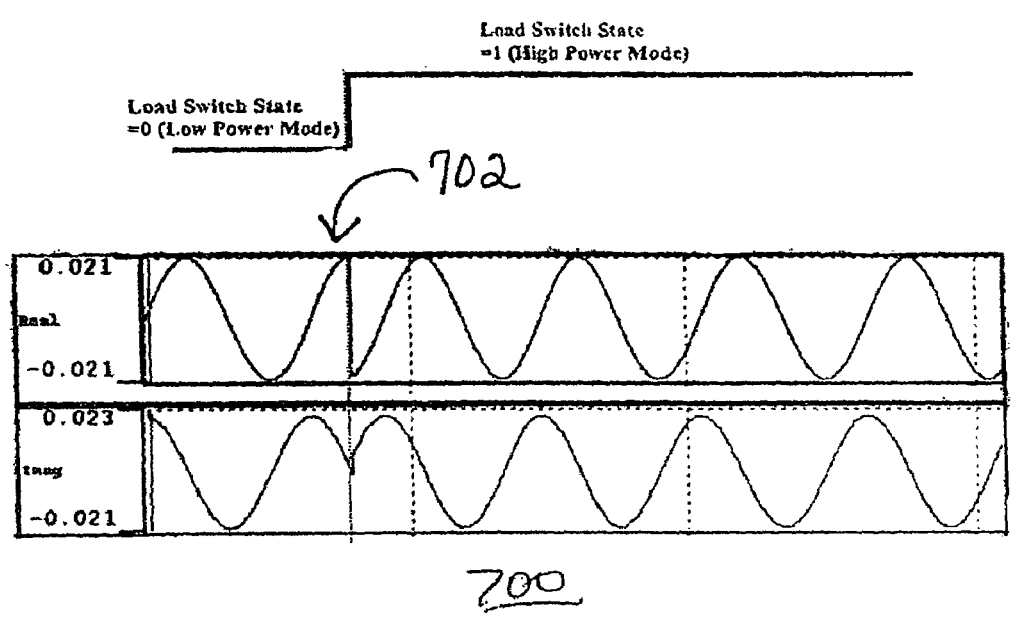
FIG. 7 is simulation results in two plots of the phase compensation of the radio frequency transmitter of FIG. 2 in accordance with the preferred embodiment of the present invention.

In FIG. 6, simulations 600 and 602 illustrate the transmit power vs. time and the system ACLR performance both without 600 and with 602 the proposed gain replacement technique. In both simulations 600, 602, a 16 dBm transmitter output power is shown at time 604 and a 24 dBm transmitter output power is shown at time 606. The transmitter output power occurs at the antenna 102. In plot 600, switching transients due to the load switch change of state without gain replacement have a large amplitude in the traces at 608. In plot 602, switching transients due to the load switch change of state with gain replacement have a much smaller amplitude and time duration in the traces at 610. FIG. 7 depicts the complex IQ (+sixty degrees) phase change 700 due to load switch state change of state from 0 to 1 at time 702.

Figure 8:
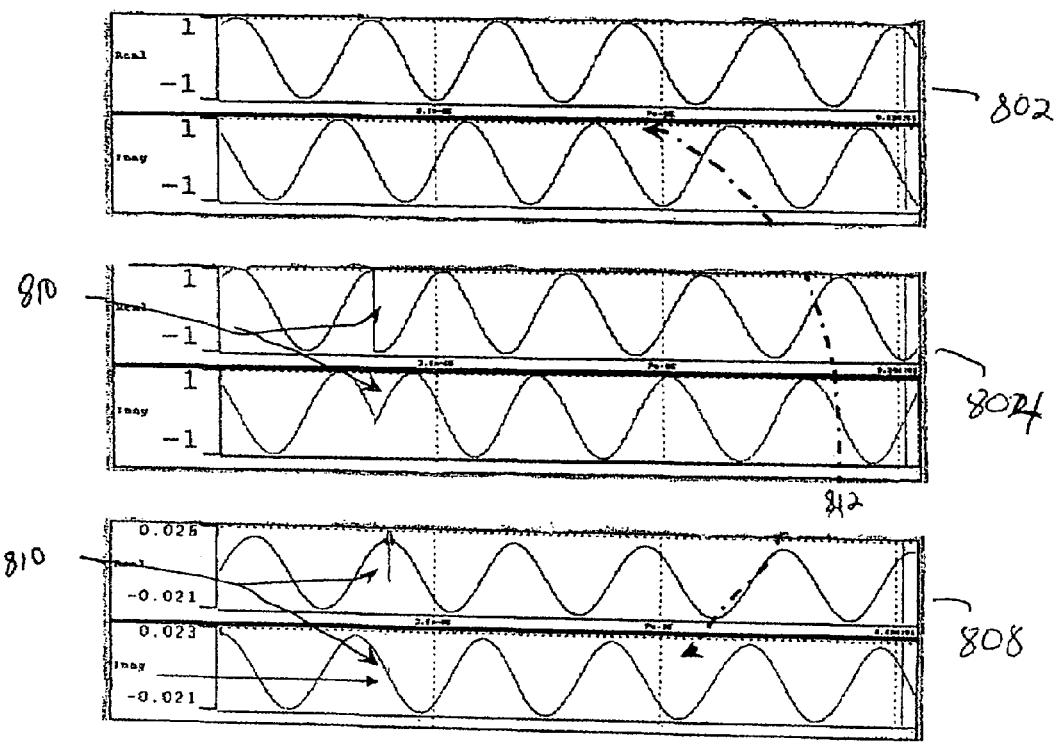
FIG. 8 is simulation results in four plots of the phase compensation of the radio frequency transmitter of FIG. 2 in accordance with the preferred embodiment of the present invention.

Prior to load switch change of state, the digital phase compensation is performed at the baseband as shown in the plots of FIG. 8. In FIG. 8, plot 802 shows the baseband I and Q channel signals, plot 804 shows −sixty degrees digital phase compensation performed at baseband, and plot 808 shows the result of digital phase compensation at the antenna 102. The digital phase compensation of −60 degrees is shown at time 810. After phase compensation and the load switch state change, the phase is retained at the antenna 102 to meet phase continuity specifications. This can also be seen by comparing the signals of plots 802 and 808 as indicated by arrows 812.

Accordingly, the present invention discloses an improved method for gain compensation in a radio frequency (RF) transmitter having a transmit feedforward signal path including at least one RF/Intermediate Frequency (IF) analog stage and having a power control signal path in a closed loop transmit power control system. The method performs gain compensation during load switching of the at least one RF/IF analog stage and includes the steps of monitoring transmit power on a feedback path of the closed loop transmit power control system, determining load switching of the at least one RF/IF analog stage in response to the transmit power and gain compensating the power control signal in response to determining the load switching of the at least one RF/IF analog stage. The method further includes the step of applying the power control signal at any point in the transmit feedforward signal path. The transmit feedforward signal path also includes a power control signal path and the step of gain compensating the power control signal occurs at any point in the power control signal path. In addition, the step of gain compensating the power control signal may include the step of performing automatic gain correction within a digital loop filter of the power control signal path.

When the at least one RF/IF analog stage is a power amplifier (PA) having a plurality of load switch states, the step of determining load switching of the at least one RF/IF analog stage comprises the step of detecting one of the plurality of load switch states of the at least one PA in response to the transmit power and the step of gain compensating the power control signal comprises the step of gain compensating the power control signal path in response to the one of the plurality of load switch states detected.

The step of determining load switching of the at least one RF/IF analog stage may also include the step of detecting when the transmit power crosses a predetermined hysteresis threshold level and the step of gain compensating the power control signal may include the step of gain compensating the power control signal in response to determining load switching of the at least one RF/IF analog stage after a predetermined delay corresponding to a time duration for a signal to travel from gain compensation to the at least one RF/IF analog stage.

In accordance with the present invention, a radio frequency (RF) transmitter has a closed loop transmit power control system and at least one RF/Intermediate Frequency (IF) analog stage in a transmit feedforward signal path having a transmit signal. A method for phase compensation during load switching of the at least one RF/IF analog stage includes the steps of monitoring transmit power on a feedback path of the closed loop transmit power control system determining load switching of the at least one RF/IF analog stage in response to the transmit power, and digitally phase compensating the transmit signal in response to determining load switching of the at least one RF/IF analog stage. The step of digitally phase compensating the transmit signal occurs at any point in the transmit feedforward signal path.

The at least one RF/IF analog stage may have a plurality of load switch states and the step of determining load switching of the at least one RF/IF analog stage would include the step of detecting one of the plurality of load switch states of the at least one RF/IF analog stage in response to the transmit signal. The step of digitally phase compensating the transmit signal would include the step of phase compensating the transmit signal in response to the one of the plurality of load switch states detected. The step of determining load switching of the at least one RF/IF analog stage may also include the step of detecting when the transmit signal crosses a predetermined hysteresis threshold level.

The step of digitally phase compensating the transmit power further includes the step of digitally phase compensating the transmit signal in response to determining load switching of the at least one RF/IF analog stage after a predetermined delay corresponding to a time duration for a signal to travel from phase compensation to the at least one RF/IF analog stage. The step of digitally phase compensating the transmit power also includes the step of performing automatic phase compensation in a digital feedforward baseband signal path of the closed loop transmit power control system.

A radio frequency (RF) transmitter having a transmitter signal path for modulating a signal to generate a transmitted signal following an RF or intermediate frequency (IF) power control stage includes at least one power amplifier (PA) located in the transmitter signal path for providing the transmitted signal therefrom, the transmitted signal having a signal power associated therewith, an RF power detector coupled to the at least one PA for detecting the signal power of the transmitted signal, an analog to digital (A/D) converter coupled to the RF power detector, moving average filter coupled to the A/D converter, a hysteresis unit coupled to the moving average filter, and a load switch control unit coupled to the hysteresis unit and the at least one power amplifier for providing load switching of the at least one power amplifier.

The RF transmitter further includes a phase compensation unit coupled to the hysteresis unit and the at least one power amplifier for providing a particular phase compensation based upon the output state of the hysteresis unit and a gain compensation unit coupled to the hysteresis unit and the at least one power amplifier for providing a particular gain compensation based upon the output state of the hysteresis unit. The RF transmitter also includes a delay alignment block coupled between the hysteresis unit and the load switch control unit for delaying the load switch control signal for a time duration corresponding to the time for a phase and gain compensated signal to travel to the power amplifier. The at least one PA comprises M load switch states and wherein the hysteresis support provides M-state hysteresis control for the hysteresis unit.

In addition, the RF transmitter includes a loop filter coupled to the hysteresis unit for controlling the gain compensation of the RF transmitter. The RF transmitter also includes a delay block coupled to the hysteresis unit for time aligning gain and phase compensations at the output of the RF or IF power control stage.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. In a radio frequency (RF) transmitter having a transmit feedforward signal path including at least one RF/Intermediate Frequency (IF) analog stage and having a power control signal path in a closed loop transmit power control system, a method for gain compensation during load switching of the at least one RF/IF analog stage, the method comprising the steps of:
   monitoring transmit power on a feedback path of the closed loop transmit power control system;
   determining load switching of the at least one RF/IF analog stage in response to the transmit power; and
   gain compensating the power control signal in response to determining the load switching of the at least one RF/IF analog stage.

2. The method of claim 1 further comprising the step of applying the power control signal at any point in the transmit feedforward signal path.

3. The method of claim 2 wherein the transmit feedforward signal path comprises a power control signal path and wherein the step of gain compensating the power control signal occurs at any point in the power control signal path.

4. The method of claim 3 wherein the step of gain compensating the power control signal comprises the step of performing automatic gain correction within a digital loop filter of the power control signal path.

5. The method of claim 1 wherein the at least one RF/IF analog stage comprises at least one power amplifier (PA) having a plurality of load switch states and wherein the step of determining load switching of the at least one RF/IF analog stage comprises the step of detecting one of the plurality of load switch states of the at least one PA in response to the transmit power, and wherein the step of gain compensating the power control signal comprises the step of gain compensating the power control signal path in response to the one of the plurality of load switch states detected.

6. The method of claim 1 wherein the step of determining load switching of the at least one RF/IF analog stage comprises the step of detecting when the transmit power crosses a predetermined hysteresis threshold level.

7. The method of claim 1 wherein the step of gain compensating the power control signal comprises the step of gain compensating the power control signal in response to determining load switching of the at least one RF/IF analog stage after a predetermined delay corresponding to a time duration for a signal to travel from gain compensation to the at least one RF/IF analog stage.

8. In a radio frequency (RF) transmitter having a closed loop transmit power control system and having at least one RF/Intermediate Frequency (IF) analog stage in a transmit feedforward signal path having a transmit signal, a method for phase compensation during load switching of the at least one RF/IF analog stage, the method comprising the steps of:

monitoring transmit power on a feedback path of the closed loop transmit power control system;

determining load switching of the at least one RF/IF analog stage in response to the transmit power; and digitally phase compensating the transmit signal in response to determining load switching of the at least one RF/IF analog stage.

9. The method of claim 8 wherein the step of digitally phase compensating the transmit signal occurs at any point in the transmit feedforward signal path.

10. The method of claim 8 wherein the at least one RF/IF analog stage has a plurality of load switch states and wherein the step of determining load switching of the at least one RF/IF analog stage comprises the step of detecting one of the plurality of load switch states of the at least one RF/IF analog stage in response to the transmit signal, and wherein the step of digitally phase compensating the transmit signal comprises the step of phase compensating the transmit signal in response to the one of the plurality of load switch states detected.

11. The method of claim 8 wherein the step of determining load switching of the at least one RF/IF analog stage comprises the step of detecting when the transmit signal crosses a predetermined hysteresis threshold level.

12. The method of claim 8 wherein the step of digitally phase compensating the transmit power comprises the step of digitally phase compensating the transmit signal in response to determining load switching of the at least one RF/IF analog stage after a predetermined delay corresponding to a time duration for a signal to travel from phase compensation to the at least one RF/IF analog stage.

13. The method of claim 8 wherein the step of digitally phase compensating the transmit power comprises the step of performing automatic phase compensation in a digital feedforward baseband signal path of the closed loop transmit power control system.

14. A radio frequency (RF) transmitter having a transmitter signal path for modulating a signal to generate a transmitted signal following an RF or intermediate frequency (IF) power control stage, the RF transmitter comprising:

at least one power amplifier (PA) located in the transmitter signal path for providing the transmitted signal therefrom, the transmitted signal having a signal power associated therewith;

an RF power detector coupled to the at least one PA for detecting the signal power of the transmitted signal;

an analog to digital (A/D) converter coupled to the RF power detector;

moving average filter coupled to the A/D converter;

a hysteresis unit coupled to the moving average filter; and a load switch control unit coupled to the hysteresis unit and the at least one power amplifier for providing load switching of the at least one power amplifier.

15. The RF transmitter of claim 14 further comprising a phase compensation unit coupled to the hysteresis unit and the at least one power amplifier for providing a particular phase compensation based upon the output state of the hysteresis unit.

16. The RF transmitter of claim 14 further comprising a gain compensation unit coupled to the hysteresis unit and the at least one power amplifier for providing a particular gain compensation based upon the output state of the hysteresis unit.

17. The RF transmitter of claim 14 further comprising a delay alignment block coupled between the hysteresis unit and the load switch control unit for delaying the load switch control signal for a time duration corresponding to the time for a phase and gain compensated signal to travel to the power amplifier.

18. The RF transmitter of claim 17 wherein the at least one PA comprises M load switch states and wherein the hysteresis support provides M-state hysteresis control for the hysteresis unit.

19. The RF transmitter of claim 14 further comprising a loop filter coupled to the hysteresis unit for controlling the gain compensation of the RF transmitter.

20. The RF transmitter of claim 14 further comprising a delay block coupled to the hysteresis unit for time aligning gain and phase compensations at the output of the RF or IF power control stage.

* * * * *